(12) United States Patent
Häring

(10) Patent No.: US 8,710,175 B2
(45) Date of Patent: *Apr. 29, 2014

(54) FUNCTIONALIZED MAIN CHAIN POLYMERS

(75) Inventor: Thomas Häring, Stuttgart (DE)

(73) Assignee: Thomas Häring, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,655

(22) Filed: Mar. 14, 2011

(65) Prior Publication Data

US 2012/0004330 A1    Jan. 5, 2012

Related U.S. Application Data

(63) Continuation of application No. 12/615,901, filed on Nov. 10, 2009, now abandoned, and a continuation of application No. 11/679,020, filed on Feb. 26, 2007, now Pat. No. 7,615,599, which is a continuation of application No. 10/852,594, filed on May 24, 2004, now Pat. No. 7,196,151.

(51) Int. Cl.
    *C08G 75/00*    (2006.01)
(52) U.S. Cl.
    USPC ........................................ 528/373
(58) Field of Classification Search
    USPC ........................................ 528/373
    See application file for complete search history.

(56) References Cited

U.S. PATENT DOCUMENTS

| | | | |
|---|---|---|---|
| 5,438,082 A * | 8/1995 | Helmer-Metzmann et al. | 522/149 |
| 5,561,202 A * | 10/1996 | Helmer-Metzmann et al. | 525/471 |
| 5,741,408 A * | 4/1998 | Helmer-Metzmann et al. | 204/252 |
| 6,214,488 B1 * | 4/2001 | Helmer-Metzmann et al. | 429/493 |
| 2001/0002408 A1 * | 5/2001 | Schnurnberger et al. | 521/27 |

* cited by examiner

*Primary Examiner* — Shane Fang
(74) *Attorney, Agent, or Firm* — Edward C. Kwok; Hogan Lovells US LLP

(57) ABSTRACT

A non crosslinked, covalently crosslinked and/or ionically crosslinked polymer, having repeating units of the general formula (1)

$$—K—R— \qquad (1)$$

In which K is a bond, oxygen, sulfur,

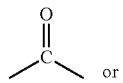 or   (2)

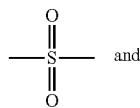

and   (3)

the radical R is a divalent radical of an aromatic or heteroaromatic compound.

9 Claims, No Drawings

FUNCTIONALIZED MAIN CHAIN POLYMERS

Functionalized fluorine free main chain polymers, like sulfonated poly aryl etherketones and polyethersulfones have been developed by the company Dupont in the past as an alternative to fluorinated cation exchanger like Nafion. Such polymer processed to membranes find use in membrane processes, particularly in hydrogen fuel cells. One distinguishes at least two types of PEM hydrogen fuel cells (PolymerElectrolyteMembrane hydrogen fuel cells). The former convert hydrogen and the latter methanol. In direct methanol fuel cells (DMFC) higher requirements are made to the membranes, than in hydrogen fuel cells which are operated exclusively with hydrogen at.

Ionically crosslinked membranes were developed by Kerres et al. These are acid base polymer blends and polymer (blend) membranes. An advantage of the ionically crosslinked acid base blend membranes is the higher flexibility of the ionic bonds and that these polymer/membranes do not dry so easily out at higher temperatures and in consequence do not become brittle so fast either. The ionic bindings show, however, the disadvantage that they start at temperatures above 60 degrees Celsius to open themselves what leads to a strong swelling up to the dissolving of the membrane.

In earlier applications was suggested to enclose a sulfonated engineering main chain polymer into a covalent network of a second polymer. This procedure leads to technically applicable membranes for the hydrogen hydrogen fuel cell, however, has the disadvantage in the DMFC that during the operation the danger of the bleeding out of the sulfonated component exists. So it was task to develop a polymer, that bleeds out in aqueous or aqueous alcoholic surroundings little or not at all. Under "bleeding" you shall understand that a water-soluble component is dissolved.

Furthermore the polymer shall show a mechanical stability as good as possible and an improved swelling behavior. The swelling behavior shall preferably increase at a temperature of 90° C. in deionized water around less than 90% as compared to the control value at 30° C. related to the extension in the dimension (length, breadth, height).

A further object was to specify a crosslinked polymer which can be used in fuel cells. The crosslinked polymer ought in particular to be suitable for use in fuel cells upward of 80° C., in particular upward of 100° C. Membranes produced from the polymer shall particularly be suitable in direct methanol fuel cells.

Further disadvantage of the fluorine free polymeric cation exchanger, like sulfonated poly aryl etherketones and sulfonated polysulfones is their lower acid strength in comparison with a polymeric fluorienated sulfonic acid, such as Nafion of Dupont, which is considered as a comparison standard from the experts. The task was therefore provided to make available a polymer with a higher acid strength than directly at the main chain sulfonated polysulfone or directly at the main chain sulfonated polyetheretherketone as PEEK or PEKEKK.

Furthermore it was task to provide a method for the production of the crosslinked polymer, too, that permits to produce the desired polymer in a simple way.

DESCRIPTION

These and additional not explicit mentioned objects are achieved by means of a polymer according to the invention which is not crosslinked, covalently crosslinked and/or ionically crosslinked as described in the patent claim 1. Meaningful variations of the polymer of the present invention and combinations from this are described in the subclaims. Processes for preparing the polymer of the present invention are described in the process claims. The claims for the use of the polymer of the present invention follow afterwards.

As far as the polymer according to the invention is a polymer with a proton exchanging group, such as sulfonic acid, phosphonic acid and/or carbonic acid, whose acid strength has been increased according to the invention and the task, a covalent and/or ionic crosslinking is not mandatory.

The non crosslinked, covalently crosslinked and/or optionally ionically crosslinked polymer according to the invention, particularly covalently crosslinked and/or optionally ionically crosslinked polymers, comprises repeating units of the general formula (1)

in which Q is a bond, oxygen, sulfur

the radical R is a divalent radical of an aromatic or heteroaromatic or aliphatic compound.

Furthermore the invention concerns polymers with fluorine in the main chain, such as polyvinylidendifluoride (PVDF), poly(vinylfluoride) (PVF) and polychlorotrifluorethylene and Analoga, like Kel-F and Neoflon. These polymers are already known and are changed into polymers of the present invention.

The polymers of the present invention get accessible by one or several modification steps of the starting polymer of the general formula (1). Polymers with repeating units of the general formula (1) are already known. They include, for example, polyarylenes, such as polyphenylene and polypyrene, aromatic polyvinyl compounds, such as polystyrene and polyvinylpyridine, polyphenylenevinylene, aromatic polyethers, such as polyphenylene oxide, aromatic thioethers, such as polyphenylene sulfide, polysulfones, such as Radel R and Ultrason, and polyether ketones, such as PEK, PEEK, PEKK and PEKEKK. Moreover, they also embrace polypyrroles, polythiophenes, polyazoles, such as polybenzimidazole, polyanilines, polyazulenes, polycarbazoles, polyindophenines, polyvinylidendifluoride (PVDF) and polychlorotrifluorethylene and analogues like Kel-F and Neoflon.

By one or more modifications with repeating units of the general formula (1) a polymer according to the invention is created with surprising properties.

By providing a polymer of the present invention, comprising repeating units of the general formula (1) is made available which is distinguished in that (a) the radical R has at least in part substituents of the general formula (4J), (4K), (4L), (4M), (4N), (4O), (4P), (4Q) and/or (4R),

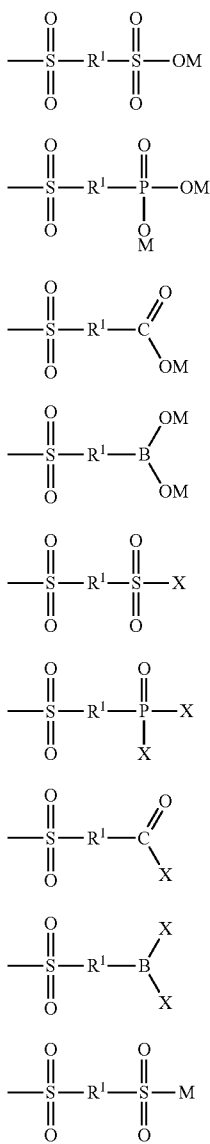

where the radicals $R^1$ independently of one another show the general formula (888-1) or (888-2)

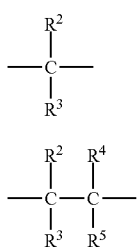

where M independently of one another is hydrogen, a one- or multivalent cation, preferably $Li^+$, $Na^+$, $K^+$, $Rb^+$, $Cs^+$, $TiO^{2+}$, $ZrO^{2+}$, $Ti^{4+}$, $Zr^{4+}$, $Ca^{2+}$, $Mg^{2+}$ or an optionally alkylated ammonium is and X is a halogen or an optionally alkylated amino group, and where $R^2$, $R^3$, $R^4$, $R^5$ independently of one another is hydrogen, (4A), (4B), (4C), (4D), (4E), (4F), (4G), (4H), (4I), (4J), (4K), (4L), (4M), (4N), (4O), (4P), (4Q) and/or (4R) or a group having from 1 to 40 carbon atoms, preferably a branched or unbranched alkyl or cycloalkyl group or an optionally alkylated aryl group or hetero aryl group is, which can be fluorinated or partly fluorinated, it being possible for at least two of the radicals $R^2$, $R^3$ and $R^4$ to be closed to form an optionally aromatic ring, and/or the radical $R^1$ is a group of the general formula (5A), (5B), (5C), (5D), (5E), (5F), (5G) and/or (5H)

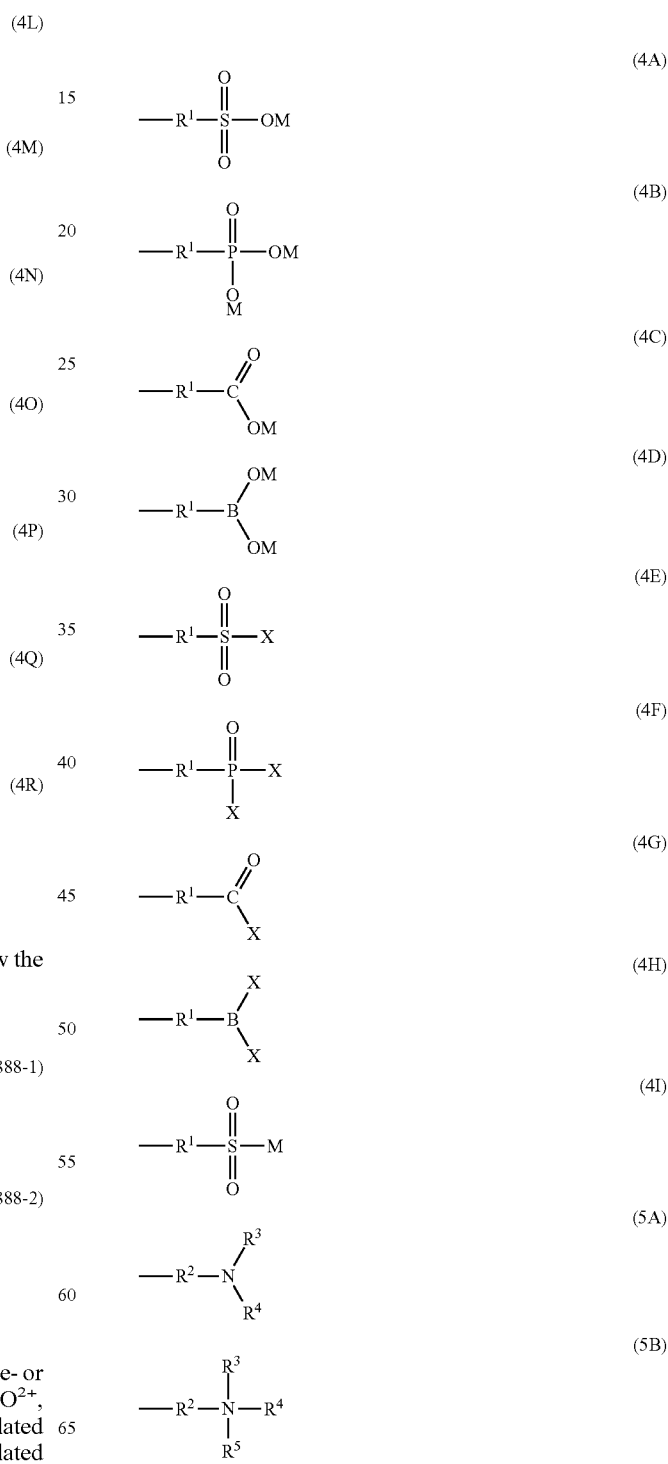

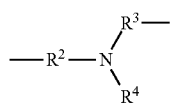
(5C)

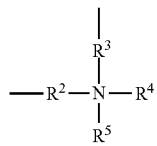
(5D)

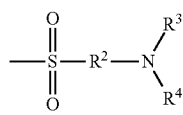
(5E)

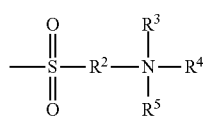
(5F)

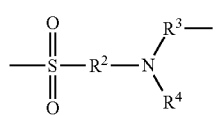
(5G)

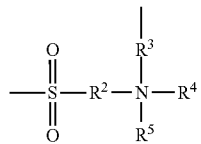
(5H)

and b) the radical R has optionally bridges of the general formula (6A), (6B), and or (6C),

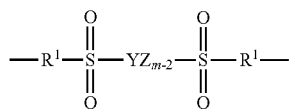
(6A)

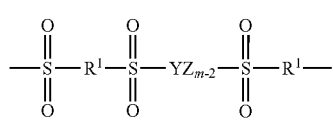
(6B)

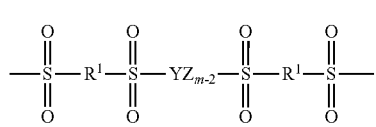
(6C)

which join at least two radicals R to one another, Y being a group having from 1 to 40 carbon atoms, preferably a branched or unbranched alkyl or cycloalkyl group or an optionally alkylated aryl group, Z is hydroxyl, a group of the general formula (7)

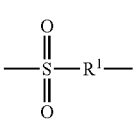
(7)

or a group having a molecular weight of more than 14 g/mol composed of the optional components (5A), (5B), (5C), (5D), (5E), (5F), (5G), (5H), (4A), (4B), (4C), (4D), (4E), (4F), (4G), (4H), (4I), (4J), (4K), (4L), (4M), (4N), (4O), (4P), (4Q), (4R), H, C, O, N, S, P, halogen atoms, one or multivalent cation and m is an integer greater than or equal to 2, it is possible in a manner which was not immediately foreseeable to make available a polymer having improved properties, in particular for membrane applications, an improved swelling properties, a better proton conductivity and further defined adjustable functional groups for the most different technical applications.

At the same time the polymer of the invention and the crosslinked polymer of the invention display a number of further advantages.

These include, among others:

The doped polymer membranes have a low specific volume resistance, preferably less than or equal to 100 Ohm×cm at 20° C.

The doped polymer membranes possess only a low permeability for hydrogen, oxygen and methanol.

Also extremely thin membranes of the polymer of the invention, with a total thickness of between 10 and 100 μm possess sufficiently good material properties at temperatures between 60° C. and 82° C. in particular a very high mechanical stability and a low permeability for hydrogen, oxygen and methanol.

The doped polymer membrane is suitable for use in fuel cells upward of 80° C., in some cases upward of 100° C. and in particular cases upward of 110° C.

The doped polymer membrane is suitable for use in fuel cells upward of 82° C., in particular under standard pressure.

The doped polymer membrane can be produced on an industrial scale.

In accordance with the present invention the polymer is covalently and/or ionically crosslinked. In accordance with the invention, crosslinked polymers are those polymers whose linear or branched macromolecules, which are of the same or different chemical identity and are present in the form of collectives, are linked to one another to form three-dimensional polymer networks. In this case the crosslinking may be effected both by way of the formation of covalent bonds and by way of the formation of ionic bonds.

The crosslinked polymer of the invention is preferably doped with acid. In the context of the present invention, doped polymers are those polymers which owing to the presence of doping agents exhibit an increased proton conductivity in comparison with the undoped polymers. Dopants for the polymers of the invention are acids. Acids in this context embrace all known Lewis and Brönsted acids, preferably inorganic Lewis and Brönsted acids. Also possible is the use of polyacids, especially isopolyacids and heteropolyacids, and mixtures of different acids. For the purposes of the present invention, heteropolyacids are inorganic polyacids having at least two different central atoms which are formed as partial mixed anhydrides from in each case weak polybasic oxygen acids of a metal (preferably Cr, Mo, V, W) and of a nonmetal (preferably As, I, P, Se, Si, Te). They include, among others, 12-molybdatophosphoric acid and 12-tungstophosphoric acid.

Dopants which are particularly preferred in accordance with the invention are sulfuric acid and phosphoric acid. One especially preferred dopant is phosphoric acid ($H_3PO_4$).

Furthermore are particularly preferred the placement of zirkonium phosphate and titan sulfate by methods of someone skilled in the art and furthermore preferred are modified and nonmodified phyllosilicate or tectosilicate. With this modification method Montmorillonite is particularly preferred, which is added during the membrane forming process. Methods for the production of doped plastic membranes are known.

The doping agents are fixed by a calcination process in the membrane and transferred into the strong Lewis acidic form. Particularly preferred is the calcination of titan sulfate and zirconium phosphate in the membrane. Optionally the calcination is followed by anew doping and/or further doping. Preferred doping agents are again phosphoric acid, sulfuric acid and the above mentioned hetero polyacids. The procedure can be repeated optionally severalfold.

A suitable calcination temperature is the temperature range of 60° C. until just below the decomposition temperature of the polymer to be doped. This is above 300° C. for fluorinated polymers and polybenzimidazole. Particularly preferred is the temperature range of 100° C. to 300° C.

Some doping agents are fixed in the membrane for a time technically applicable by the calcination.

The crosslinked polymer of the invention has repeating units of the general formula (1), especially repeating units corresponding to the general formulae (1A), (1B), (1C), (1D), (1E), (1F), (1G), (1H), (1I), (1T), (1K), (1L), (1M), (1N), (1O), (1P), (1Q), (1R), (1S) and/or (1T):

$$—O—R^6— \quad (1A)$$
$$—S—R^6— \quad (1B)$$
$$—O—R^6—SO_2—R^6— \quad (1C)$$
$$—O—R^6—SO_2—R^6—O—R^6 \quad (1D)$$
$$—O—R^6—SO_2—R^6—O—R^6—R^6 \quad (1E)$$
$$—O—R^6—SO_2—R^6—O—R^6—\underset{\underset{CH_3}{|}}{\overset{\overset{CH_3}{|}}{C}}—R^6— \quad (1F)$$
$$—O—R^6—SO_2—R^6—R^6—SO_2—R^6— \quad (1G)$$
$$—O—R^6—SO_2—R^6—R^6—SO_2—R^6—O—R^6—SO_2—R^6— \quad (1H)$$
$$—(\!(\!O—R^6—SO_2—R^6\!)_x\!(\!SO_2—R^6—R^6\!)_y\!)— \quad (1I)$$

with 0<X, Y<100%
based on the number of all repeating units $$—O—R^6—CO—R^6— \quad (1J)$$
$$—O—R^6—CO—R^6—CO—R^6— \quad (1K)$$
$$—O—R^6—CO—R^6—O—R^6—CO—R^6—CO—R^6— \quad (1L)$$
$$—O—R^6—O—R^6—CO—R^6— \quad (1M)$$
$$—O—R^6—O—R^6—CO—R^6—CO—R^6— \quad (1N)$$
$$—(\!R—NH—R—NH\!)_y— \quad (1O)$$

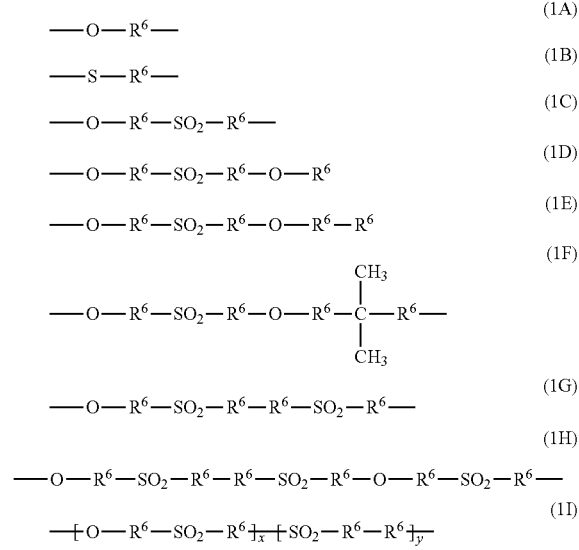

mit0<y100%
with 0<X, Y<100%

$$—R^6— \quad (1P)$$
$$—R^6—CH\!=\!CH— \quad (1Q)$$
$$—CHR^7—CH_2— \quad (1R)$$

(1S)

(1T)

Independently of one another here the radicals $R^6$ which are identical or different, are 1,2-phenylene, 1,3-phenylene, 1,4-phenylene, 4,4'-biphenyl, a divalent radical of a heteroaromatic, a divalent radical of a $C_{10}$ aromatic, a divalent radical of a $C_{14}$ aromatic and/or a divalent pyrene radical. An example of a $C_{10}$ aromatic is naphthalene; of a $C_{14}$ aromatic, phenanthrene. The substitution pattern of the aromatic and/or heteroaromatic is arbitrary, in the case of phenylene, for example, $R^6$ may be ortho-, meta- and para-phenylene.

The radicals $R^7$, $R^8$ and $R^9$ designate monovalent, tetravalent and trivalent aromatic or heteroaromatic groups, respectively, and the radicals U, which are identical within a repeating unit, are an oxygen atom, a sulfur atom or an amino group which carries a hydrogen atom, a group having 1-20 carbon atoms, preferably a branched or unbranched alkyl or alkoxy group, or an aryl group as a further radical.

The polymers with repeating units of the general formula (1) that are particularly preferred in the context of the present invention include homopolymers and copolymers, examples being random copolymers, such as Victrex 720 P and Astrel. Especially preferred polymers are polyaryl ethers, polyaryl thioethers, polysulfones, polyether ketones, polypyrroles, polythiophenes, polyazoles, phenylenes, polyphenylenevinylenes, polyanilines, polyazulenes, polycarbazoles, polypyrenes, polyindophenines and polyvinylpyridines, especially polyaryl ethers:

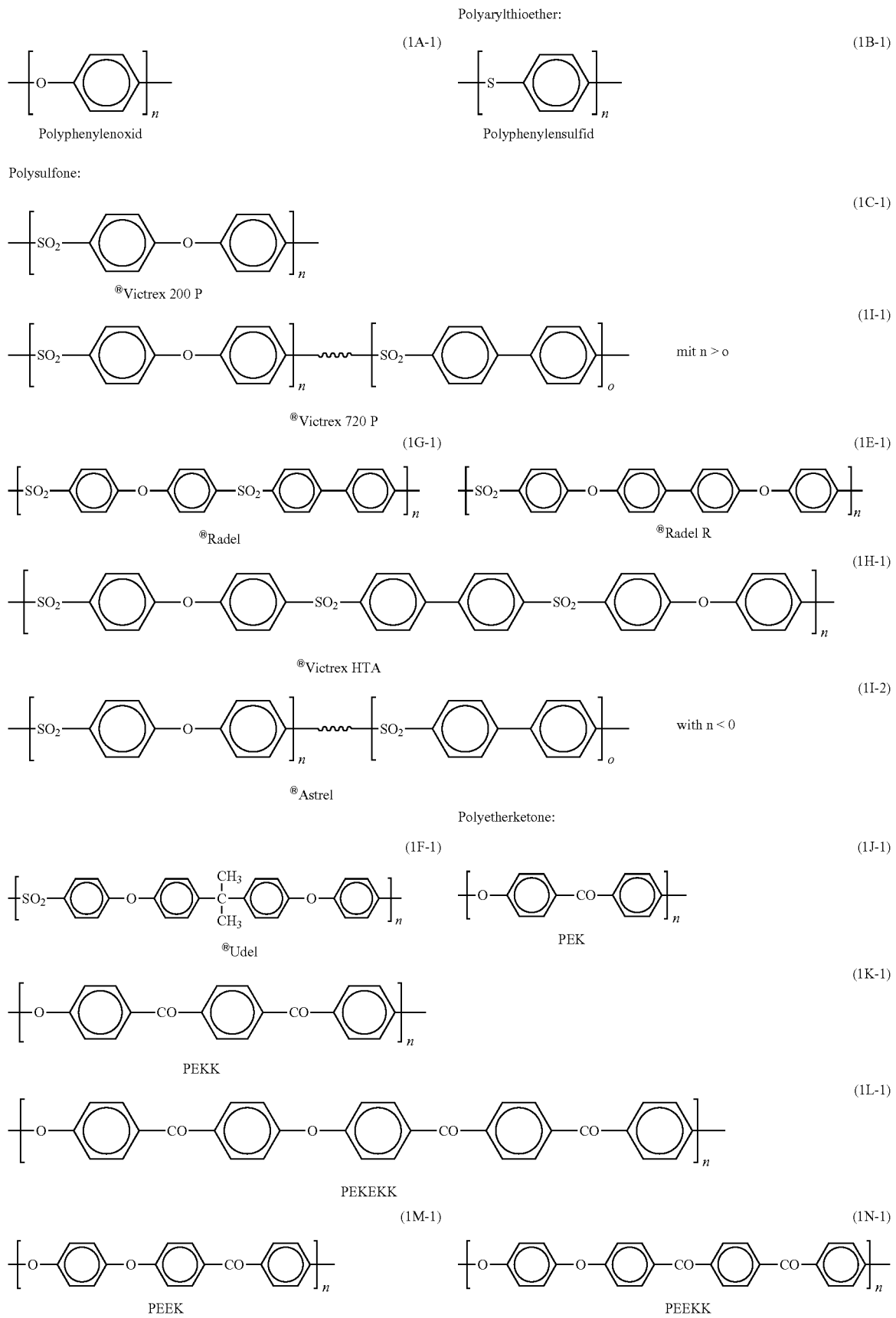

-continued
Polypyrrole:
(1P-1)
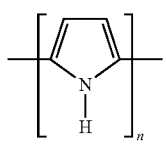
Polythiophene:
(1P-2)
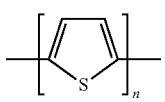
Polyazole:
(1S-1)
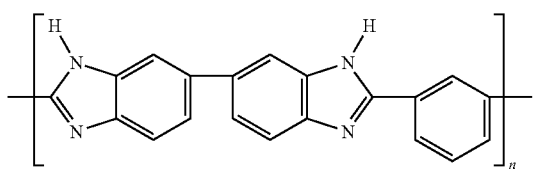
Polybenzimidazol
Polyphenylene:
(1P-3)
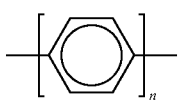
Polyphenylenvinylen:
(1Q-1)
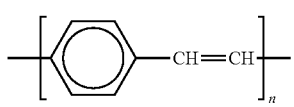
Polyanilin:
(1O-1)
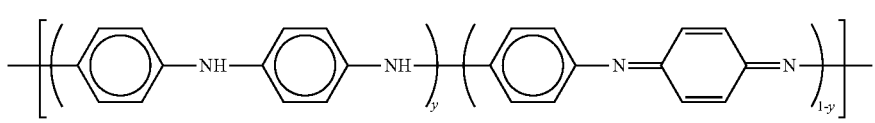
Polyazulen:
(1P-4)
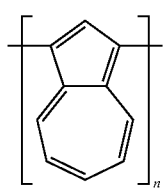
Polycarbazol:
(1P-5)
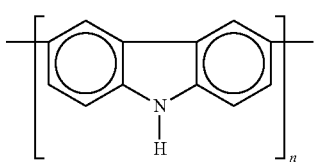
Polypyren:
(P1-6)
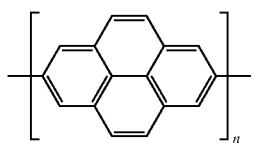
Polyindophenine:
(1P-7)
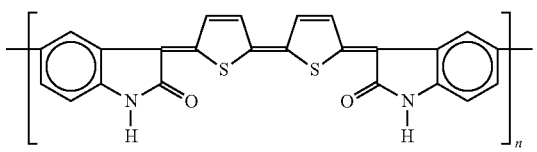
Polyvinylpyridin:
(1R-1)
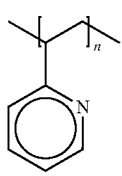
(1R-2)
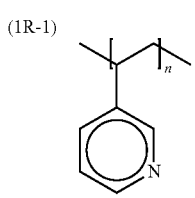
(1R-3)
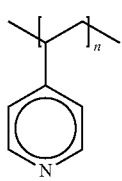

Especially preferred in accordance with the invention are crosslinked polymers with repeating units of the general formula (1A-1), (1B-1), (1C-1), (1I-1), (1G-1), (1E-1), (1H-1), (1I-1), (1F-1), (1J-1), (1K-1), (1L-1), (1M-1) and/or (1N-1).

In the context of the present invention, n designates the number of repeating units along one macromolecule chain of the crosslinked polymer. This number of the repeating units of the general formula (1) along one macromolecule chain of the crosslinked polymer is preferably an integer greater than or equal to 10, in particular greater than or equal to 100. The number of repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T) along one macromolecule chain of the crosslinked polymer is preferably an integer greater than or equal to 10, in particular greater than or equal to 100.

In one particularly preferred embodiment of the present invention, the numerical average of the molecular weight of the macromolecule chain is greater than 25,000 g/mol, appropriately greater than 50,000 g/mol, in particular greater than 100,000 g/mol.

The crosslinked polymer of the invention may in principle also contain different repeating units along a macromolecule chain. Preferably, however, along one macromolecule chain it contains only identical repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T).

In the context of the present invention the radical R has at least in part substituents of the general formula (4A), (4B), (4C), (4D), (4E), (4F), (4G), (4H), (4I), (4J), (4K), (4L), (4M), (4N), (4O), (4P), (4Q) and/or (4R), preferably of the general formula (4A), (4B), (4C), (4D), (4J), (4K), (4L) and/or (4M), appropriately of the general formula (4A), (4B), (4C), (4J), (4K) and/or (4L), in particular of the general formula (4J) and/or (4K):

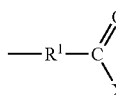 (4A)

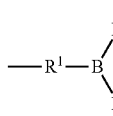 (4B)

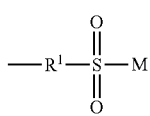 (4C)

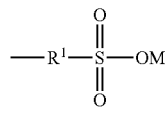 (4D)

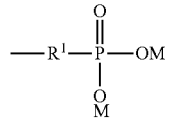 (4E)

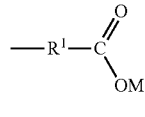 (4F)

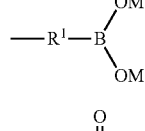 (4G)

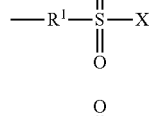 (4H)

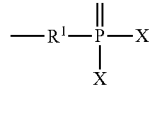 (4I)

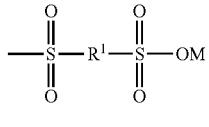 (4J)

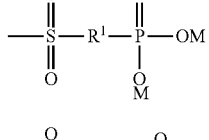 (4K)

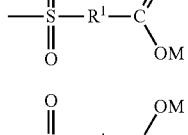 (4L)

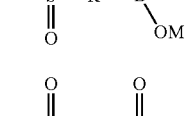 (4M)

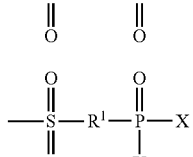 (4N)

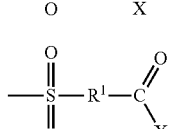 (4O)

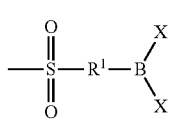 (4P)

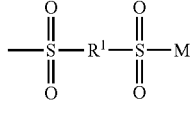 (4Q)

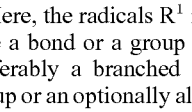 (4R)

Here, the radicals $R^1$ independently of one another designate a bond or a group having from 1 to 40 carbon atoms, preferably a branched or unbranched alkyl or cycloalkyl group or an optionally alkylated aryl group, which optionally contain one or more fluorine atoms.

In the context of one especially preferred embodiment of the present invention, $R^1$ is a methylene group ($-CH_2-$)

and/or a partially or completely fluorinated methylene group (—CFH—) or (—CF$_2$—). Additionally to the structure as defined in the previous sentence, R$^1$ designates in a further especially preferred embodiment a bond. R$^1$ contains the formula (888-1) or (888-2).

M stands for hydrogen, a one or multi-valent metal cation, preferably Li$^+$, Na$^+$, K$^+$, Rb$^+$, Cs$^+$, Zr$^{4+}$, Ti$^{4+}$, ZrO$^{2+}$, or an optionally alkylated ammonium ion, appropriately for hydrogen or Li$^+$, in particular for hydrogen.

X is a halogen or an optionally alkylated amino group.

Moreover, in accordance with the invention, the radical R has in part substituents of the general formula (5A), (5C), (5D), (5E), (5F), (5G), (5H) and/or (5B), preferably (5E),

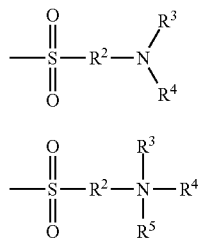
(5E)

(5F)

and/or the radical R is in part a group of the general formula (5G) and/or (5H), preferably (5G).

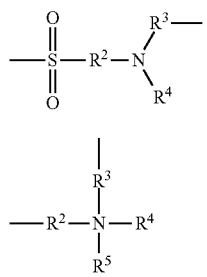
(5G)

(5H)

In this context the radicals R$^2$, R$^3$, R$^4$ and R$^5$ independently of one another denote a group having from 1 to 40 carbon atoms, preferably a branched or unbranched alkyl or cycloalkyl group or an optionally alkylated aryl group, it being possible for at least two of the radicals R$^2$, R$^3$, R$^4$ and R$^5$ to be closed to form an optionally aromatic ring.

Particularly advantageous effects can be achieved if R has at least in part substituents of the general formula (5A-1) and/or (5A-2).

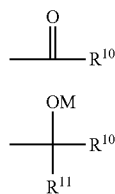
(5A-1)

(5A-2)

Here, the radicals R$^{10}$ denotes an optionally alkylated aryl group, which contains at least one optionally alkylated amino group, or an optionally alkylated heteroaromatic, which either has at least one optionally alkylated amino group or has at least one nitrogen atom in the heteroaromatic nucleus. R$^{11}$ is hydrogen, an alkyl, cycloalkyl, aryl or heteroaryl group or a radical R$^{10}$ with the definition specified above, it being possible for R$^{10}$ and R$^{11}$ to be identical or different.

Especially preferred in accordance with the invention are substituents of the formula (5A-1) in which R$^{10}$ is an optionally alkylated aniline radical or pyridine radical, preferably an alkylated aniline radical. Moreover, particular preference is also given to substituents of the formula (5A-2) in which R$^{10}$ and R$^{11}$ are optionally alkylated aniline radicals or pyridine radicals, preferably alkylated aniline radicals.

In the context of the present invention the radical R can have in part bridges of the general formula (6),

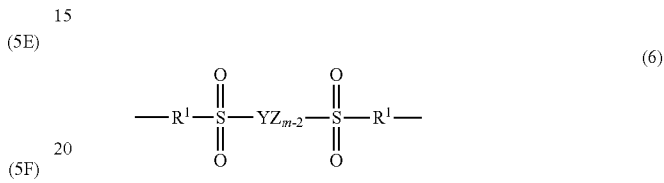
(6)

which join at least two radicals R to one another, Y being a group having 1 to 40 carbon atoms, preferably a branched or unbranched alkyl or cycloalkyl group or optionally alkylated aryl group, appropriately a linear or branched alkyl group containing from 1 to 6 carbon atoms.

Z designates hydroxyl, a group of the general formula

(7)

or a group having a molecular weight of more than 20 g/mol composed of the optional components H, C, O, N, S, P and halogen atoms, and m stands for an integer greater than or equal to 2, preferably 2.

The polymer of the invention is preferably doped with acid. In the context of the present invention, doped polymers are those polymers which owing to the presence of doping agents exhibit an increased proton conductivity in comparison with the undoped polymers. Dopants for the polymers of the invention are acids. Acids in this context embrace all known Lewis and Brönsted acids, preferably inorganic Lewis and Brönsted acids. Also possible is the use of polyacids, especially isopolyacids and heteropolyacids, and mixtures of different acids. For the purposes of the present invention, heteropolyacids are inorganic polyacids having at least two different central atoms which are formed as partial mixed anhydrides from in each case weak polybasic oxygen acids of a metal (preferably Cr, Mo, V, W) and of a nonmetal (preferably As, I, P, Se, Si, Te). They include, among others, 12-molybdatophosphoric acid and 12-tungstophosphoric acid.

Dopants which are particularly preferred in accordance with the invention are sulfuric acid and phosphoric acid. One especially preferred dopant is phosphoric acid (H$_3$PO$_4$).

By way of the degree of doping it is possible to influence the conductivity of the polymer membrane of the invention. As the concentration of dopant goes up, the conductivity increases until a maximum is reached. In accordance with the invention, the degree of doping is reported as mole acid per mole repeating unit of the polymer. In the context of the present invention a degree of doping of between 3 and 15, in particular between 6 and 12, is preferred.

Processes for preparing doped polymer membrane are known. In one preferred embodiment of the present invention they are obtained by wetting a polymer of the invention for an appropriate time, preferably 0.5-96 hours, with particular preference 1-72 hours, at temperatures between room temperature and 100° C. and, where appropriate, under elevated pressure with concentrated acid, preferably with highly concentrated phosphoric acid.

The spectrum of properties of the crosslinked polymer of the invention can be modified by varying its ion exchange capacity. The ion exchange capacity lies preferably between 0.5 meq/g and 1.9 meq/g, based in each case on the total mass of the polymer.

The polymer of the invention has a low specific volume resistance, preferably of not more than 100 Ωcm, appropriately of not more than 50 Ωcm, in particular of not more than 20 Ωcm, in each case at 25° C.

The properties of the polymer membrane of the invention may be controlled in part by its total thickness. Nevertheless, even extremely thin polymer membranes possess very good mechanical properties and relatively low permeability for hydrogen, oxygen, and methanol. They are therefore suitable for use in fuel cells upward of 80° C., appropriately upward of 100° C., and in particular for use in fuel cells upward of 120° C., without it being necessary to reinforce the edge region of the membrane electrode assembly. The total thickness of the doped polymer membrane of the invention is preferably between 50 and 100 μm, appropriately between 10 and 90 μm, in particular between 20 and 80 μm.

In the context of one especially preferred embodiment of the present invention it swells by less than 100% in deionised water at a temperature of 90° C.

Processes for preparing the crosslinked polymer of the invention are obvious to the person skilled in the art. Nevertheless, in the context of the present invention a procedure which has proven especially suitable is that in which one or more precursor polymers which individually or in to contain the functional groups a), b) and d), d) designating sulfinate groups of the general formula (6)

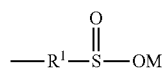

(6)

is or are reacted with a compound of the general formula (7)

YL$_m$ (7)

where L is a leaving group, preferably an F, Cl, Br, I, tosylate, and n is an integer greater than or equal to 2, preferably 2. Each precursor polymer preferably has repeating units of the general formula (1). Furthermore, appropriately, it is not covalently crosslinked.

Where in at least one precursor polymer the radical R has at least in part substituents of the general formula (5A) or is at least in part a group of the general formula (5C), the reaction with the compound (7) may also, moreover, lead to the formation of bridges of the general formula (8) and/or (9).

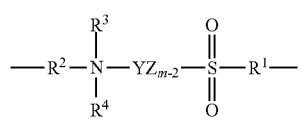

(8)

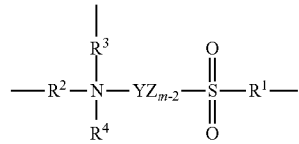

(9)

Also conceivable is the formation of bridges between different substituents of the general formula (5A) and/or between different groups of the general formula (5C).

In one particularly preferred embodiment of the present invention a polymer mixture is used comprising
1) at least one precursor polymer having functional groups a),
2) at least one precursor polymer having functional groups b), and
3) at least one precursor polymer having functional groups d).

In another particularly preferred embodiment of the present invention a polymer mixture is used comprising
1) at least one precursor polymer having functional groups a) and b) and
2) at least one precursor polymer having functional groups d).

In accordance with another particularly preferred embodiment of the present invention it may also be particular advantageous to use a polymer mixture comprising
1) at least one precursor polymer having functional groups a) and d) and
2) at least one precursor polymer having functional groups b).

Furthermore, processes wherein use is made of a polymer mixture comprising
1) at least one precursor polymer having functional groups a) and
2) at least one precursor polymer having functional groups b) and d)
also constitutes a particularly preferred embodiment of the present invention.

In accordance with the invention it may also be exceptionally appropriate to use at least one polymer having functional groups of the general formula a), b) and d).

The precursor polymer or polymers for use in accordance with the invention may in principle have different repeating units of the general formula (1). Preferably, however, they have only identical repeating units of the general formula (1A), (1B), (1C), (1D), (1E), (1F), (1G), (1H), (1I), (1J), (1K), (1L), (1M), (1N), (1O), (1P), 1Q), (1R), (1S) and/or (1T).

The number of repeating units of the general formula (1A), (1B), (1C) (1D), (1E), (1F), (1G) (1H), (1I), (1J), (1K), (1L), (1M), (1N), (1O), (1P), (1Q) (1R), (1S) and/or (1T) is preferably an integer greater than or equal to 10, preferably at least 100 repeating units.

In one particularly preferred embodiment of the present invention the numerical average of the molecular weight of the precursor polymer or polymers is greater than 25,000 g/mol, appropriately greater than 50,000 g/mol, in particular greater than 100,000 g/mol.

The synthesis of the precursor polymers having functional groups of the general formula a), b) and/or d) is already known. It can take place, for example, by reacting a polymer of the general formula (1) with n-butyllithium in a dried aprotic solvent, preferably tetrahydrofuran (THF), under an inert gas atmosphere, preferably argon, and so lithiating it.

In order to introduce the functional groups, the lithiated polymer is [lacuna] in a manner known per se with suitable functionalizing agents, preferably with alkylating agent of the general formula L-Subst. (10)

where Subst. is the substituent to be introduced; with ketones and/or aldehydes, which are reacted to the corresponding alkoxides; and/or with carboxylic esters and/or carbonyl halides, which are reacted to the corresponding ketones. The introduction of sulfonate groups may also be effected by reacting the lithiated polymer with $SO_3$, and the introduction of sulfinate groups by reacting the lithiated polymer with $SO_2$.

Through successive reaction with two or more different functionalizing agents, polymers are obtained which have at least two different substituents.

For further details, refer to the state of the art, in particular to the documents U.S. Pat. No. 4,833,219, J. Kerres, W. Cui, S. Reichle; New sulfonated engineering polymers via the metalation route. 1. "Sulfonated poly-(ethersulfone) PSU Udel via metalation-sulfination-oxidation" J. Polym. Sci.: Part A: Polym. Chem. 34, 2421-2438 (1996), WO 00/09588 A1, whose disclosure content is hereby explicitly incorporated by reference.

The degree of functionalization of the precursor polymers lies preferably in the range from 0.1 to 3 groups per repeating unit, preferably between 0.2 and 2.2 groups per repeating unit. Particular preference is given to precursor polymers having from 0.2 to 0.8 groups a), preferably sulfonate groups, per repeating unit. Moreover, precursor polymers having from 0.8 to 2.2 groups b) per repeating unit have been found particularly appropriate. Moreover, particularly advantageous results are achieved with precursor polymers which have from 0.8 to 1.3 groups d) per repeating unit.

In the context of the present invention it has proven especially appropriate to dissolve the precursor polymer or polymers in a dipolar-aprotic solvent, preferably in N,N-dimethylformamide, N,N-dimethyl-acetamide, N-methylpyrrolidone, dimethyl sulfoxide or sulfolane, and to react the solution with the halogen compound, with stirring.

Particularly advantageous results can be achieved here if a) the polymer solution is spread as a film on a substrate, preferably on a glass plate or a woven or nonwoven fabric, and b) the solvent is evaporated, where appropriate at an elevated temperature of more than 25° C.

c) and/or under a reduced pressure of less than 1000 mbar, to give a polymer membrane.

The properties of the polymer of the invention may also be enhanced by a) treating the polymer in a first step with an acid and b) treating the polymer in a further step with deionised water, the polymer being treated where appropriate with an aqueous alkali prior to the first step.

Possible fields of use for the polymer of the invention are evident to the skilled worker. It is particularly suitable for all applications which are indicated for crosslinked polymers having low specific volume resistances, preferably less than 100 Ωcm at 25° C. On the basis of their characteristic properties, they are suitable in particular for applications in electrochemical cells, preferably in secondary batteries, electrolysis cells, and in polymer electrolyte membrane fuel cells, especially in hydrogen fuel cells and direct methanol fuel cells.

Moreover, they may also be employed to particular advantage in membrane separation operations, preferably in the context of gas separation, pervaporation, perstraction, reverse osmosis, nanofiltration, electrodialysis, and diffusion dialysis.

The invention is illustrated in more detail below using examples and comparative examples, without any intention that the teaching of the invention should be restricted to these examples. The property values reported, like the values described above, were determined as follows:

In order to determine the ion exchange capacity, IEC, a piece of protonated ionomer membrane was dried to constant weight. 1 mg of the membrane was introduced into about 50 ml of saturated NaCl solution. As a result, there was ion exchange of the sulfonate groups, with the $H^+$ ions passing into the saturated solution. The solution with the membrane was shaken or stirred for about 24 hours. Thereafter, 2 drops of the indicator bromothymol blue were added to the solution, which was titrated with 0.1-normal NaOH solution until the change of color from yellow to blue. The IEC was calculated as follows:

IEC [meq/g]=(normality of NaOH [meq/ml]*consumption of NaOH [ml]*factor of NaOH)/mass of membrane [g].

The specific volume resistance $R^{sp}$ of the membranes was determined by means of impedance spectroscopy (IM6 impedance meter, Zahner elektrik) in a Plexiglas unit with gold-coated copper electrodes (electrode area 0.25 cm²). Here, in accordance with the invention, the impedance at which the phase angle between current strength and voltage was 0 designates the specific volume resistance. The actual measurement conditions were as follows: 0.5 N HCl was used, the membrane under measurement was packed between two Nafion 117 membranes, and the multilayer arrangement of Nafion 117/membrane/Nafion 117 membrane was pressed between the two electrodes. In this way, the interfacial resistances between membrane and electrode were eliminated by measuring first of all the multilayer arrangement of all three membranes and then the two Nafion 117 membranes alone. The impedance of the Nafion membranes was substrated from the impedance of all three membranes. In the context of the present invention the specific volume resistances were determined at 25° C.

In order to determine the swelling, the membranes were equilibrated in deionised water at the respective temperature and then weighed ($=m^{swollen}$). The membranes were then dried at elevated temperature in a drying oven and weighed again ($=m^{dry}$). The degree of swelling is calculated as follows:

$$Q=(m^{swollen}-m^{dry})/m^{dry}$$

a) polymers used
a-1) PSU Udel
PSU P 1800 (Amoco)

a-2) PEK-SO₃Li:
Lithium salt of sulfonated polyether ketone PEK

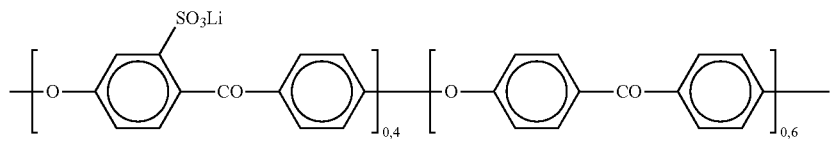

Preparation:

100 g of PEK-SO₃H having an ion exchange capacity of 1.8 meq SO₃H/g polymer were stirred for 24 hours in 1000 ml of a 10% strength by weight aqueous LiOH solution. Thereafter the Li-exchanged PEK-SO₃Li was filtered off, washed with water until the wash water gave a neutral reaction, and then dried at 100° C. for 48 h. The resulting polymer contained 0.4 SO₃Li units per repeating unit (ion exchange capacity (IEC) of the protonated form=1.8 meq SO₃H/g).

a-3) PSU-SO₂Li:

Lithium salt of sulfinated polyether sulfone PSU Udel

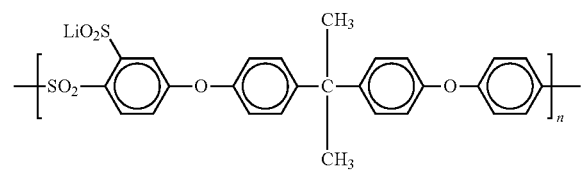

obtained in accordance with U.S. Pat. No. 4,833,219 or J. Kerres, W. Cui, S. Reichle; New sulfonated engineering polymers via the metalation route. 1. "Sulfonated poly(ethersulfone) PSU Udel via metalation-sulfination-oxidation" J. Polym. Sci.: Part A: Polym. Chem. 34, 2421-2438 (1996) IEC of the protonated form=1.95 meq SO₂Li/g a-4) PSU-DPK:

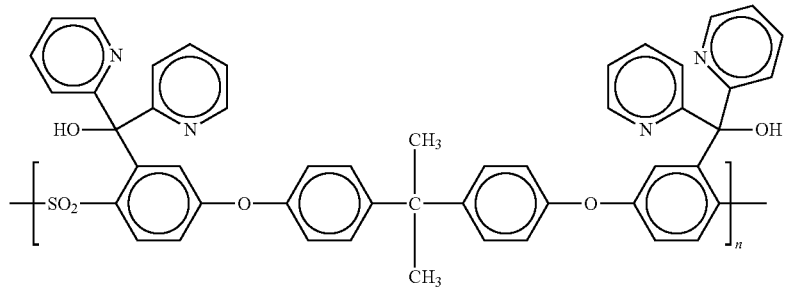

obtained by reacting 2,2'-dipyridyl ketone with lithiated PSU Udel (in accordance with WO 00/09588 A1);

one 2,2'-dipryidyl ketone unit per repeating unit a-5) a-5) Synthesis of PSU-P3-SO₂Li, PSU-EBD-SO₂Li, PSU-P3-SO₂Li,

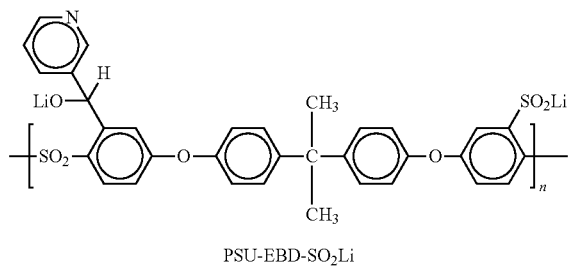

PSU-EBD-SO₂Li

-continued

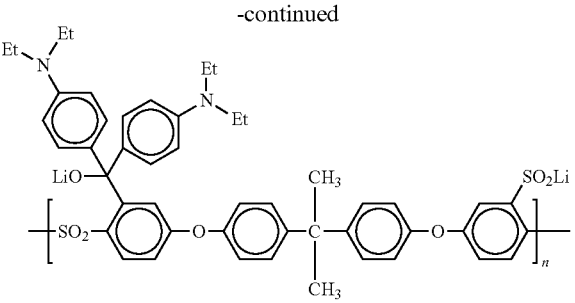

First of all PSU Udel was dissolved in dry THF and the solution was cooled to −75° C. under argon. Traces of water in the reaction mixture were removed with 2.5 M n-butyllithium (n-BuLi). The dissolved polymer was subsequently lithiated with 10 M n-BuLi. The batch was left to react for one hour and then pyridine-3-aldehyde or 4,4'-bis(N,N-diethylamino)benzo-phenone was added. The reaction temperature was thereafter raised to −20° C. for one hour. For the reaction with SO₂ it was subsequently cooled again to −75° C. and the SO₂ was passed in.

For working up, 10 ml of an isopropanol/water mixture was introduced by syringe into the reaction solution, which was heated to room temperature, and the polymer was precipitated in an excess of isopropanol, and the resulting polymer was filtered off and washed, where appropriate with isopropanol. For purification, the polymer was suspended in methanol and filtered off again. The polymer was dried in vacuo, preferably at 80° C. The degrees of substitution were obtained by quantitative evaluation of the ¹H-NMR spectra.

TABLE 1

Synthesis of PSU-P3-SO₂Li and PSU-EBD-SO₂Li

| | Ansatz | Substitutionsgrad pro Wiederholungseinheit |
|---|---|---|
| PSU-P3-SO₂Li | 10 ml 10M BuLi<br>1000 ml THF<br>22.1 g PSU Udel ®<br>5.35 g Pyridin-3-aldehyd<br>SO₂ | 0,8 Pyridin-3-aldehyd<br>1,2 SO₂Li |

TABLE 1-continued

Synthesis of PSU-P3-SO$_2$Li and PSU-EBD-SO$_2$Li

| | Ansatz | Substitutionsgrad pro Wiederholungseinheit |
|---|---|---|
| PSU-DEB-SO$_2$Li | 10 ml 10M BuLi<br>1000 ml THF<br>22.1 g PSU Udel ®<br>16.22 g 4,4'-Bis-(N,N-diethylamino) benzophenon SO$_2$ | 0,4 4,4-Bis(N,N-diethyl amino)benzophenon<br>1,6 SO$_2$Li | b.) Membrane Production

The polymers PEK-SO$_3$Li, PSU-P3-SO$_2$Li, PSU-EBD-SO$_2$Li, PSU-DPK and/or PSUSO$_2$Li were dissolved in NMP in accordance with Table 2 and filtered. The polymer solution was then degassed in vacuo and subsequently admixed with 1,4-diiodobutane. It was subsequently poured onto a glass plate and drawn but using a doctor blade. The glass plate was dried in an oven at 60° C. for 1 hour, then at 90° C. for a further hour and finally at 120° C. under vacuum overnight. The plate was cooled to room temperature and placed in a waterbath. The membrane was separated from the glass plate and stored in 10% HCl in an oven at 90° C. for one day. It was subsequently conditioned in deionised water at 60° C.

The polymer of the present invention as described so far as well as all possible combinations is characterised in that it has at least one substituent of the general formula (4J), (4K), (4L), (4M), (4N), (4O), (4P), (4Q) and/or (4R). If it has not a substituent of the group mentioned above, than it sows at least a substituent of the general formula (5C), (5D), (5G), (5H) or that it is crosslinked by a crosslinking bridge of the general formula (6B) and/or (6C).

Particularly preferred is the presence of substituent (2J) and/or (2K).

Polymer-(2J)

Polymer-(2K)

Surprisingly, it has been shown that the acid strength of a proton exchanging acid, especially of sulfonic acid and phosphoric acid, is increased in the presence of a sulfo group at the carbon atom bearing the proton exchanging group.

Subsequent figures illustrate the structures:

In the examples is R=polymer substituent

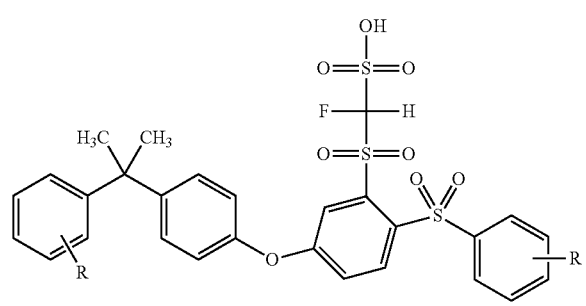

Ionic Form = HL
pKa[HL/L + H; 2] = -5,73±

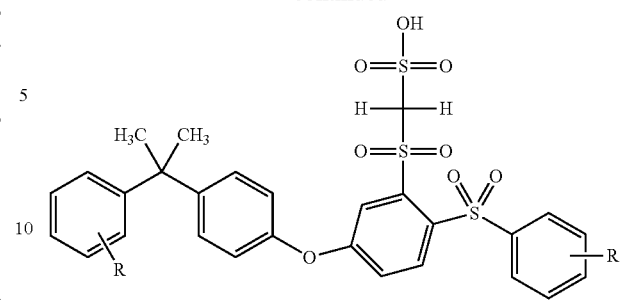

Ionic Form = HL
pKa[HL/L + H; 2] = -4,53±

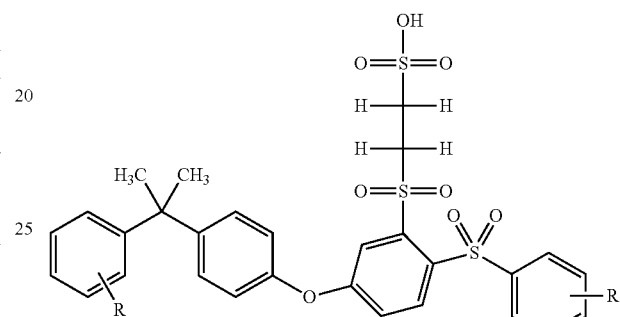

Ionic Form = HL
pKa[HL/L + H; 4] = -2,83±

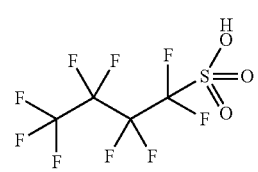

Ionic Form = HL
pKa[HL/L + H; 3] = -5,96 ± 0.20
Nafion-analogue for comparaison

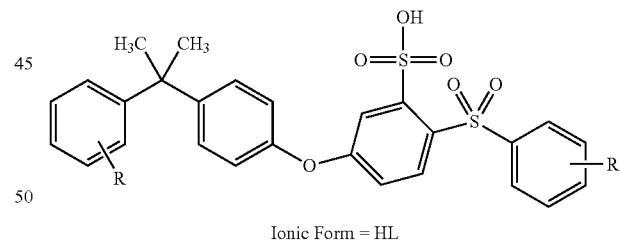

Ionic Form = HL
pKa[HL/L + H; 3] = -1,39±

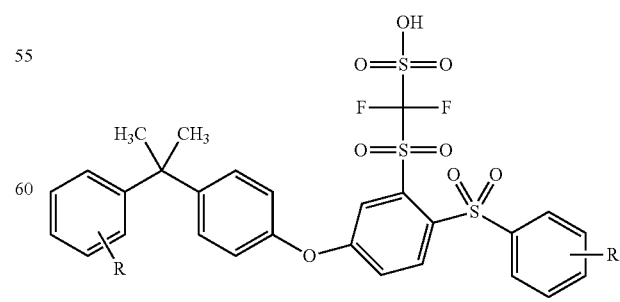

Ionic Form = HL
pKa[HL/L + H; 5] = -4,76±

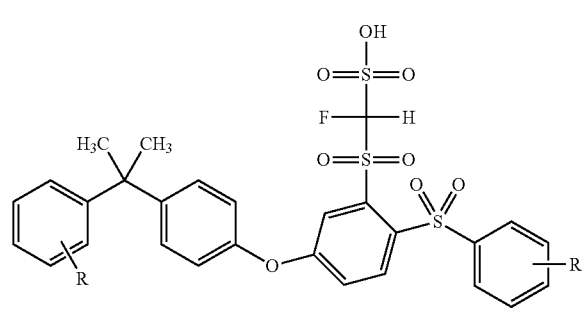

Ionic Form = HL
pKa[HL/L + H; 4] = -4,34±

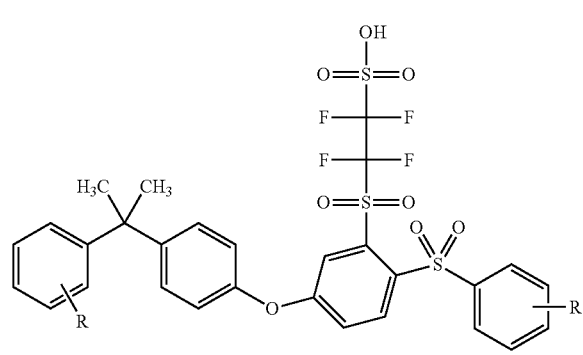

Ionic Form = HL
pKa[HL/L + H; 2] = -4,95±

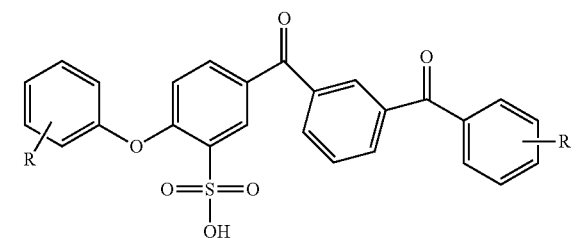

Ionic Form = HL
pKa[HL/L + H; 3] = -1,18±

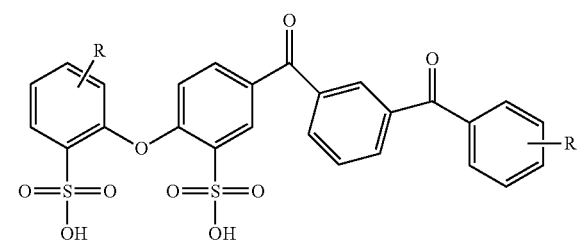

Ionic Form = H2L
pKa[HL/L + H; 2] = -0,69±
pKa[HL/L + H; 7] = -1,45±

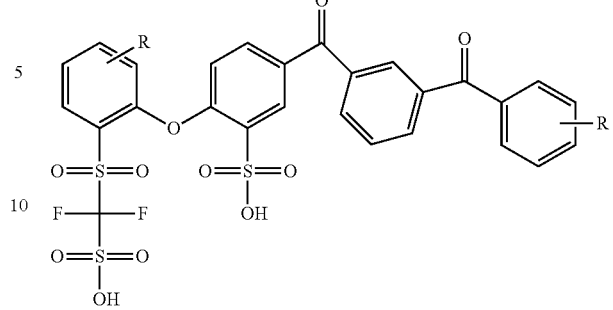

Ionic Form = H2L
pKa[HL/L + H; 13 = -1,28±
pKa[HL/L + H; 3] = -6,04±

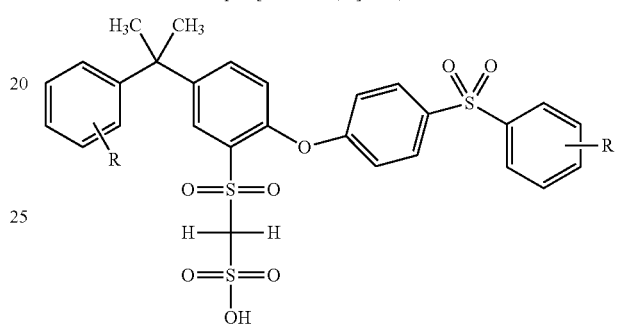

Ionic Form = HL
pKa[HL/L + H; 2] = -4,37±

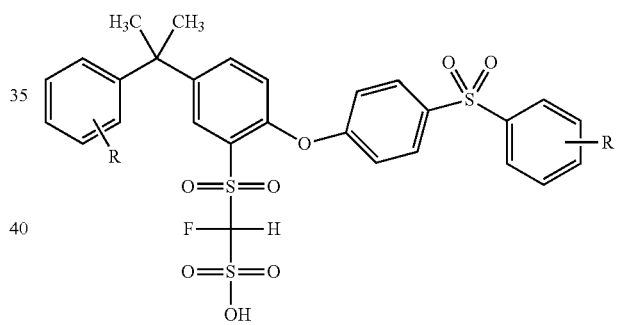

Ionic Form = HL
pKa[HL/L + H; 3] = -5,61±

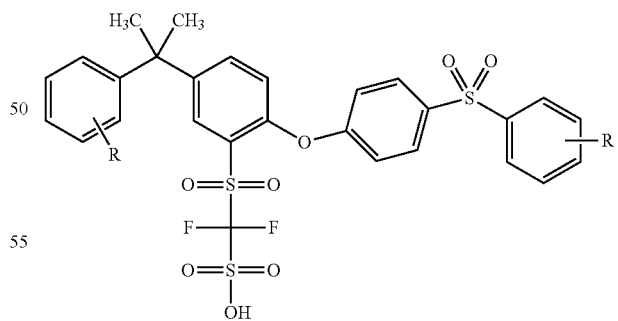

Ionic Form = HL
pKa[HL/L + H; 4] = -6,04±

According to the present invention are also polymers which start only from sulfinated polymers of the general formula (1) and where the sulfinate groups are transformed in subsequent reactions in sulfonic groups which are crosslinked partly or completely by a carbon containing radical with a further sulfinated polymer. The carbon containing radical R carries the functional groups. These can be acids or/and bases.

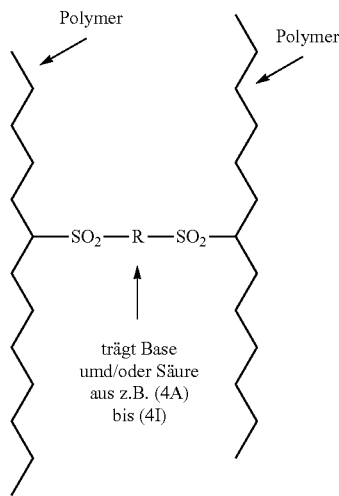

The polymers of the present invention and the membranes produced from these are suited for the production of membrane electrode arrays. The electrodes applied on the membrane, e.g. in form of a paste, ink or by a powder coating method, can be crosslinked covalently by alkylating crosslinker with reactive groups to the membrane. The membrane as well as the applied electrodes contain before the reaction not yet reacted sulfinic acid groups, especially preferred are sulfinates. If di- or oligo halogeno crosslinker, which if necessary contain functional groups (4A) to (4R), are added to the electrode paste containing precursor of polymeric cation exchanger as well as polymeric sulfinates, then the polymeric sulfinates of the electrode paste react with the free polymeric sulfinates of the membrane. The resulting covalent crosslink solves an existing problem in the lacking bonding of the electrodes to the membrane.

Possible fields of use for the polymer of the invention and covalently crosslinked and/or ionically crosslinked polymer of the invention are evident to the skilled worker. It is particularly suitable for all applications which are indicated for crosslinked polymers, especially with ion conductance. Particularly suitable for applications in electrochemical cells, preferably in secondary batteries, electrolysis cells, and in polymer electrolyte membrane fuel cells, especially in hydrogen fuel cells and direct methanol fuel cells.

Moreover, the polymers of the present invention may be employed in other membrane separation operations, preferably in gas separation, pervaporation, perstraction, reverse osmosis, nanofiltration, electrodialysis, perstraction and diffusion dialysis.

The invention is illustrated below using examples, without any intention that the teaching of the invention should be restricted to these examples.

The new polymers can be prepared by different methods.

As an example the route via a polymeric sulfinic acid is shown. Polymeric sulfinic acids are accessible among others by preparations described by Guiver et al. and also by Kerres et al. The polymeric sulfinic acid salt reacts with a mono or oligo halide bearing at least a further functional group (4A) to (4I) compound by elimination of Li halide and sulfur alkylation or sulfurarylation. The halide compound contains preferably the halides fluorine, chlorine, bromine and/or iodine as cleavable anion. Iodine is eliminated already at room temperature (25° C.), bromine at temperatures over 30° C. and chlorine is eliminated only under drastic conditions. Fluorine is a leaving group if the fluorine atom is connected to an aryl group or an hetero aryl group, a simple example is p-fluorine benzene sulfonate.

The remaining radical e.g. (4A) to (4I) carries now the desired functional group. By the neighbouring sulfonic group the acid strength is increased considerably. Between the sulfonic group and the proton exchanging group, e.g. sulfonic acid, is at least one carbon atom, preferred are the methylene group —$CH_2$— and the ethylene group —$CH_2$—$CH_2$—. The increase in acid strength is with up to two carbon atoms in direct line to the proton exchanging group clearly detectable. Membranes made from the polymer of the invention show a better proton conductivity compared to identical polymers with the proton exchanging group directly connected to the aromatic ring. If one of the neighbouring hydrogen atoms is additionally replaced with fluorine there is a further increase in acid strength.

Subsequently is the preparation of a sulfonic acid which acid strength is strongly increased by the neighbouring group —$SO_2$—$CH_2$—.

Sulfinated polysulfone PSU-$SO_2$—Li is prepared as described as under a-3). The IEC of the protonated form is 1.95 meq $SO_2$Li/g. It is dissolved in NMP and then an equivalent amount of the sodium salt of bromine methane sulfonate is added. After heating ne obtains the following compound dissolved in NMP PSU-$SO_2$—$CH_2$—$SO_3^-Na^+$ with an IEC of 1.95 meq $SO_3$Li/g.

Instead of bromine methane sulfonate bromine ethane sulfonate (sodium salt) is reacted in the next example with PSU-$SO_2$—Li. The reaction is successful and after evaporation of the solvent and recrystalliation the pure compound PSU-$SO_2$—$CH_2CH_2$—$SO_3^-Na^+$ is obtained. If in the last example not the equivalent amount of bromine ethane sulfonate (sodium salt) is added but only half, PSU-$SO_2$—$CH_2CH_2$—$SO_3^-Na^+$ with an IEC of 0.9 meq $SO_3$Li/g is obtained and an IEC of 1.0 meq $SO_2$Li/g remains in the same molecule. The solvent is evaporated in the drying oven at a temperature of appr. 80° C. until the solution has a concentration of appr. 10-15% weight. Then it is cooled to room temperature (25° C.) and an equivalent amount of diiodine butane is added. The amount of diiodine butane is calculated based on the crosslinking of the free sulfinate groups. The solution is then processed to a membrane on a glass plate and the remaining solvent NMP is evaporated in the drying oven. Acovalent crosslinked membrane is obtained which proton exchanging group has a considerably bigger acid strength as the control. Also the oxidation of the excess sulfinate groups to sulfonic acid groups is economised as it should be done in the control. The proton conductivity of the membrane with PSU-$SO_2$—$CH_2CH_2$—$SO_3H$ is 20% lower as in the control, which has only PSU-$SO_3H$ as proton exchanging group.

A considerable increase in the stability of the membrane has been realized using PEEK-SO—Li with an IEC of 2.3 meq $SO_2$Li/g. Following figure explains the reaction:

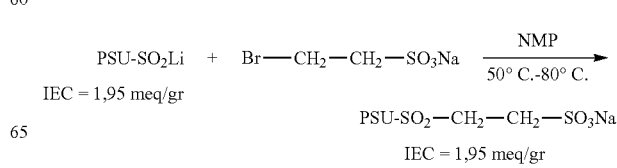

-continued

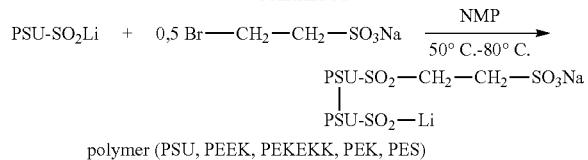

polymer (PSU, PEEK, PEKEKK, PEK, PES)

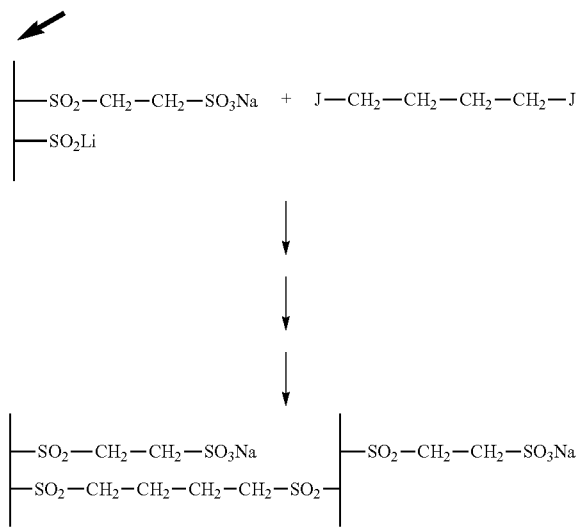

The membrane is transformed by posttreatment in aqueous mineral acid and water in the acid form. Additionally the formed salts are removed. The following figure explains one embodiment of the polymer of the invention.

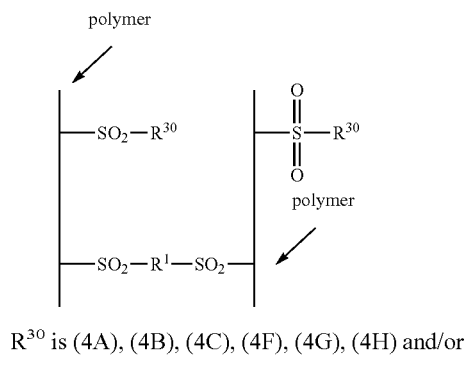

$R^{30}$ is (4A), (4B), (4C), (4F), (4G), (4H) and/or

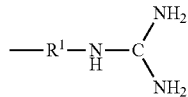

where H at the nitrogen can be substituted by an aryl- or alkyl group. $R^1$ can contain additionally a functional group from (4A) to (4R), and a group from (5A) to (5H).

In a further especially preferred embodiment polymers are prepared, which display one of the following groups:

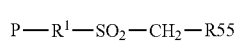 (15-1)

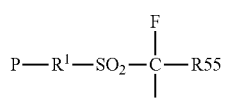 (15-2)

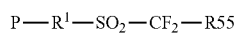 (15-3)

where P is a polymer as described on pages 9 to 16. $R^1$ is defined as in the description of $R^1$ for the substituents (4A), (4B), (4C), (4D), (4F), (4G), (4H), (4I), (4J), (4K), (4L), (4M), (4N), (4O), (4P), (4Q) or (4R). R55 is one of the substituents from (4A), (4B), (4C), (4D), (4F), (4G), (4H), (4I), (4J), (4K), (4L), (4M), (4N), (4O), (4P), (4Q) or (4R).

Furthermore are preferred polymers which shows one of the following groups

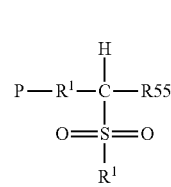 (15-4)

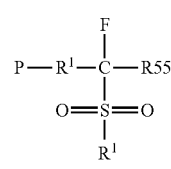 (15-5)

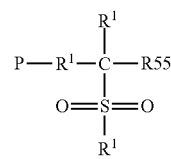 (15-6)

where P is a polymer as described on pages 9 to 16. $R^1$ is defined as in the description of $R^1$ for the substituents (4A), (4B), (4C), (4D), (4F), (4G), (4H), (4I), (4J), (4K), (4L), (4M), (4N), (4O), (4P), (4Q) or (4R). R55 is one of the substituents from (4A), (4B), (4C), (4D), (4F), (4G), (4H), (4I), (4J), (4K), (4L), (4M), (4N), (4O), (4P), (4Q) or (4R).

In the following further routes are disclosed to the person skilled in the art to prepare at least one of the groups (15-1), (15-2), (15-3), (15-4), (15-5) or (15-6).

After Guiver et al. or Kerres et al. and an application not yet published polymeric sulfinic acids are state of the art. A polymeric sulfinic acid is alkylated after the general formula

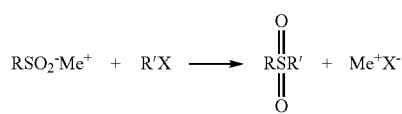

To this e.g. sulfinated polysulfone is dissolved in NMP and mixed with an equivalent amount of iodine etane carbonic acid. Already after slight heating lithium iodide is eliminated and the corresponding sulfone with an endstanding carboxyl group is formed.

Another example is sulfinated PEEK or PEK or PEKEKK or PEEKK.

A further route:
Polysulfone is metallated according to prior art with butyl lithium at −60° C. as described by e.g. Guiver. Then an equivalent amount of methyl iodide is added. One let rise to −10° C. in order to completely methylate the polysulfone. The methylated polysulfone is cooled down again to −60° C. and the equivalent amount of butyl lithium is added to the metallation. Then the equivalent amount of one molecule $SO_2Cl_2$ per at least more than once metallated methyl group is added and then iodine dissolved in THF is injected. The preparation is described in detail in the patent application DE 3636854 A1. The resulting polymer is fluorinated by the generally known Finkelstein reaction and is freed from solvent. The polymer is then hydrolyzed in water, acid and/or base and the sulfonic acid is liberated.

$$PSU\text{-}Li + CH_3J \rightarrow PSU\text{-}CH_3 + LiJ$$

$PSU\text{-}CH_3$ is e.g.

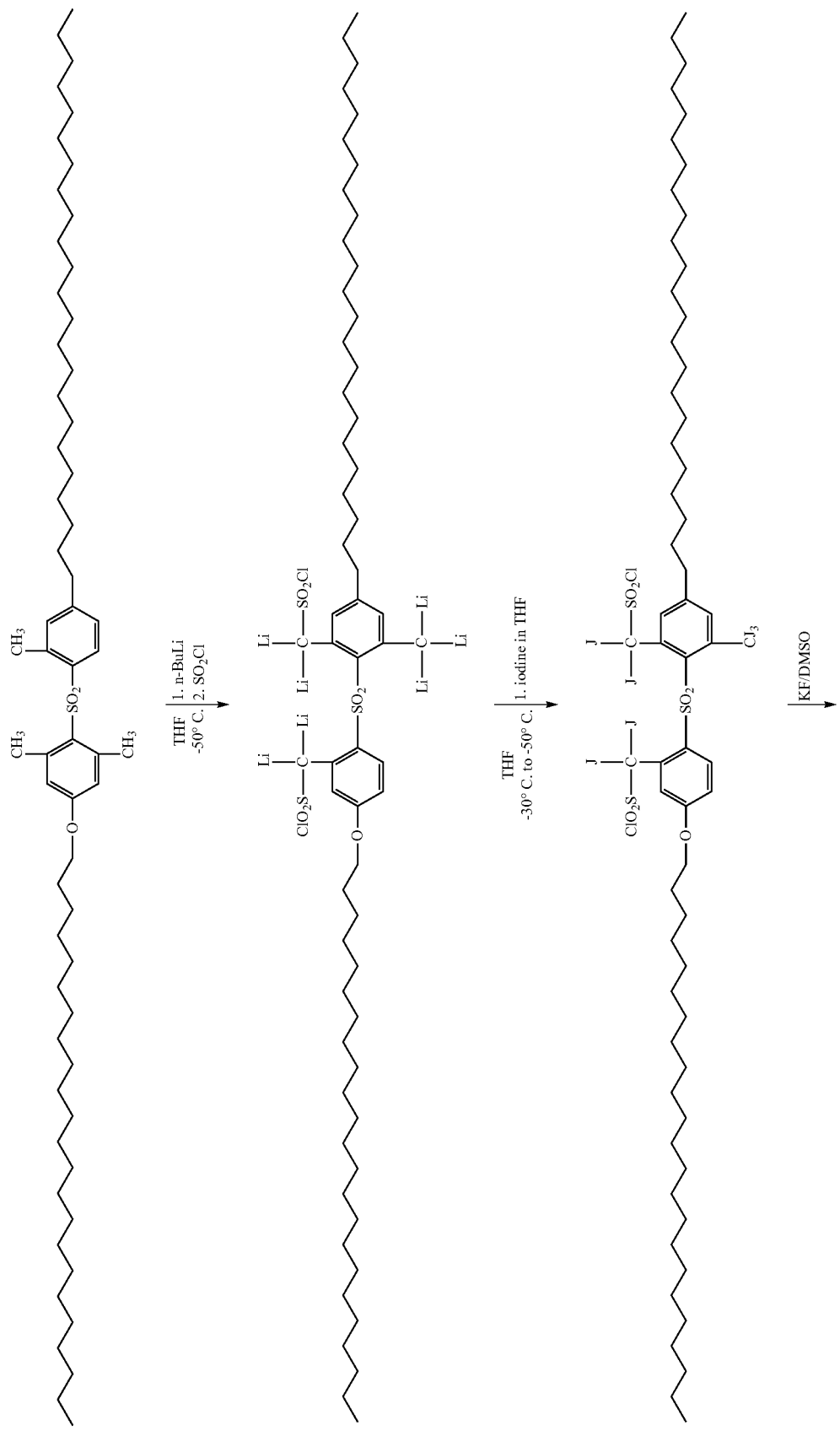

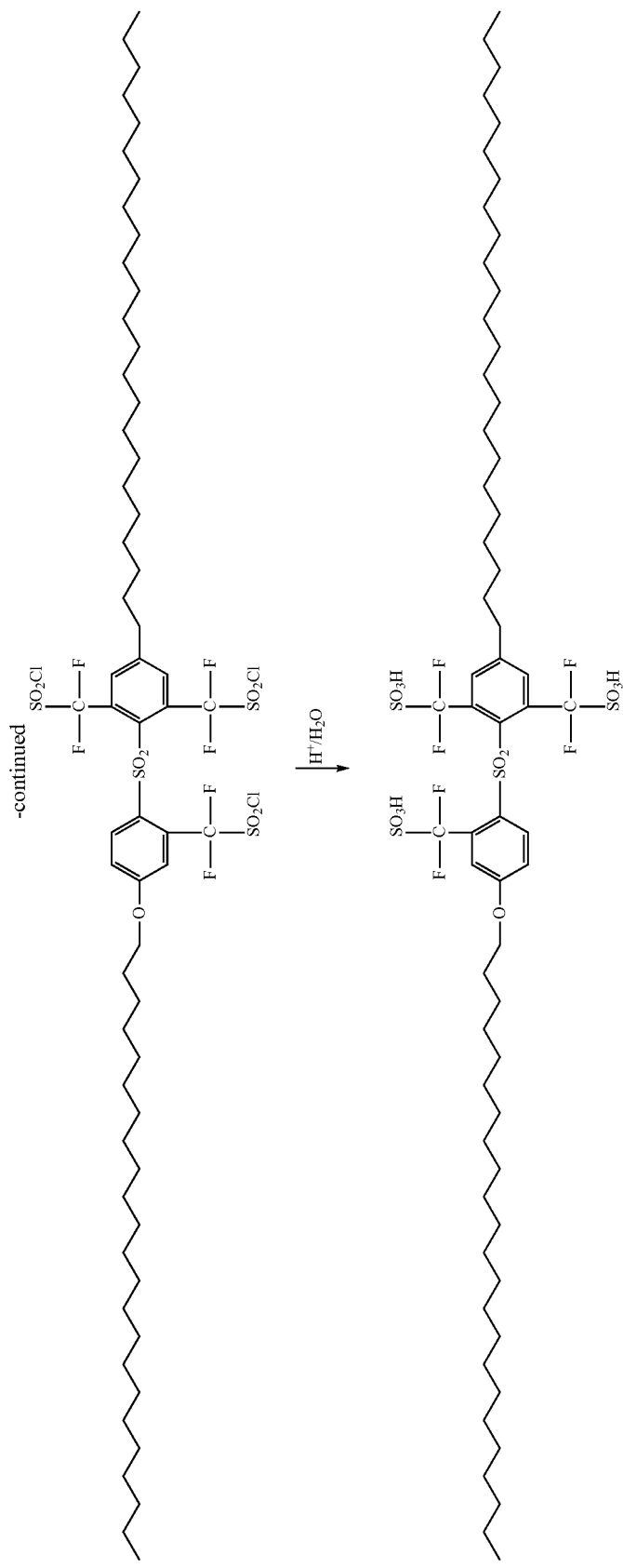

Further Route:

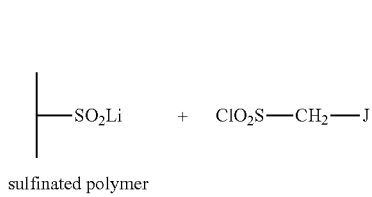

sulfinated polymer

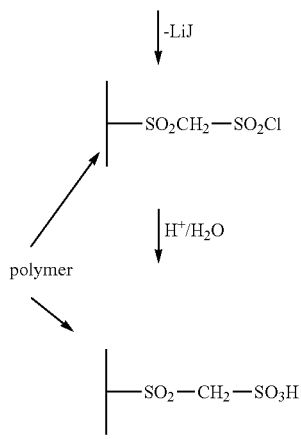

polymer

Further Route:

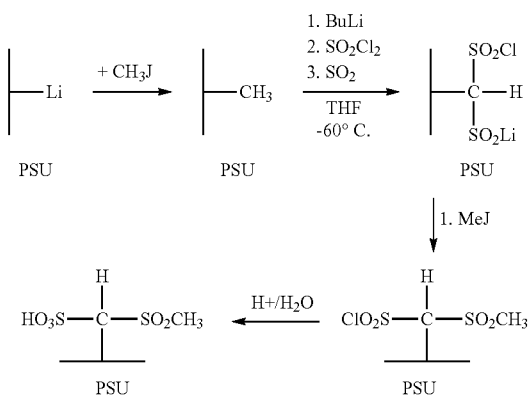

Further Route:

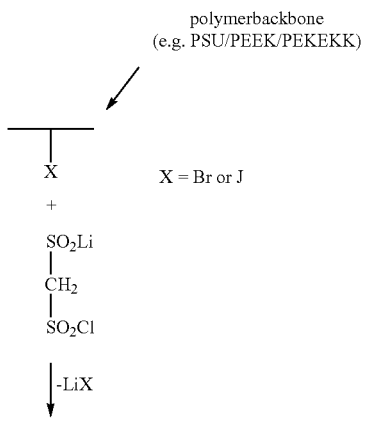

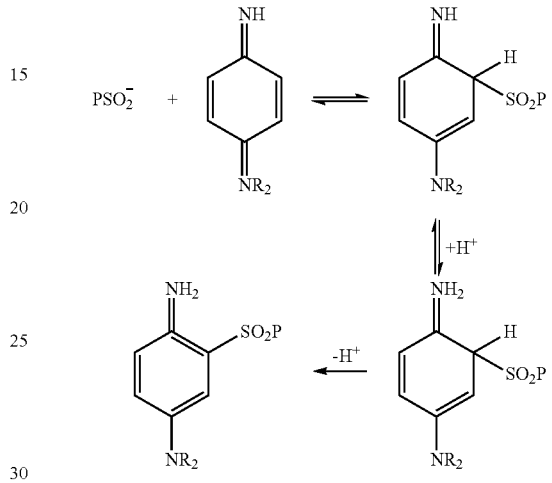

The polymeric sulfinic acids (P—SO$_2$Li) P=polymer can react as a nucleophil with:

in which R can be taken from R$^1$.
Further Alkylating Agents are:

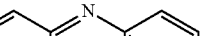

R can independently from each other be taken from R$^1$.

What is claimed is:

1. A non crosslinked, covalently cross-linked and/or ionically cross-linked polymer, having repeating units of the general formula (1)

—K—R—   (1)

in which K is a bond, oxygen, sulfur, (2)

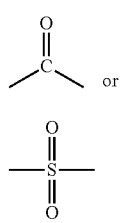 or (3)

and the radical R is a divalent radical of an aromatic or heteroaromatic compound, comprising:

a) at least in part substituents of the general formulae (4J), (4K), (4L) (4M), (4N), (4O), (4P), (4Q), or (4R)

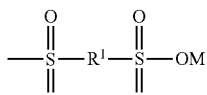 (4J)

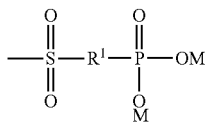 (4K)

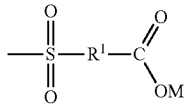 (4L)

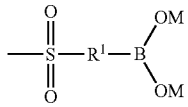 (4M)

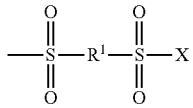 (4N)

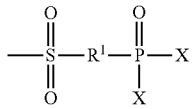 (4O)

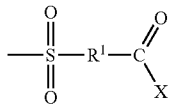 (4P)

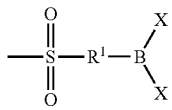 (4Q)

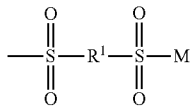 (4R)

where the radicals $R^1$ is a bond or a group having 1 to 40 carbon atoms, including a branched or unbranched alkyl or cycloalkyl group or an alkylated aryl group, M is hydrogen, a metal cation, selected from the group consisting of $Li^+$, $Na^+$, $K^+$, $Rb^+$, $Cs^+$, $TiO^{2+}$, $ZrO^{2+}$, and an alkylated ammonium ion, and X is a halogen or an alkylated amino group; or b) at least in part substituents of the general formulae (5E) and/or (5F)

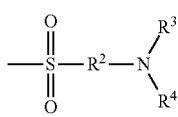 (5E)

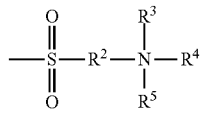 (5F)

in which $R^2$, $R^3$, $R^4$ and $R^5$ independently of one another are hydrogen (except for $R^2$), a group having from 1 to 40 carbon atoms, including a branched or unbranched alkyl or cycloalkyl group or an alkylated aryl group.

2. The polymer of claim 1, wherein the repeating units of the general formula (1) are units corresponding to the general formulae (1A), (1B), (1C), (1D), (1E), (1F), (1G), (1H), (1I), (1J), (1K), (1M), (1N), and/or (1T),

 (1A)

 (1B)

 (1C)

 (1D)

 (1E)

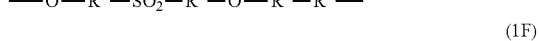 (1F)

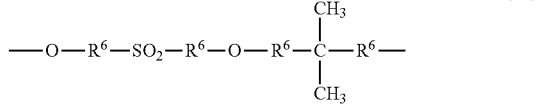 (1G)

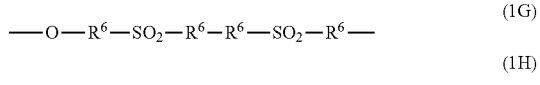 (1H)

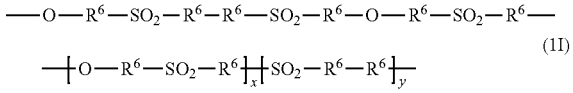 (1I)

with 0<x, y<100%, based on the number of all repeating units

 (1J)

 (1K)

 (1L)

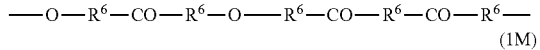 (1M)

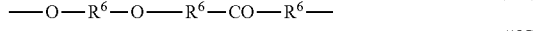 (1N)

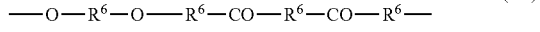 (1O)

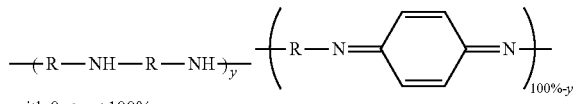

with $0 < y < 100\%$

 (1P)

 (1Q)

 (1R)

-continued

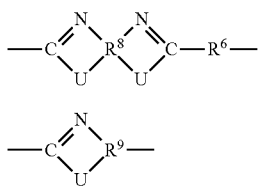

in which the radicals $R^6$ independently of one another, which are identical or different, are 1,2-phenylene, 1,3-phenylene, 1,4-phenylene, 4,4'-biphenyl, a divalent radical of a heteroaromatic, a divalent radical of a $C_{10}$ aromatic, a divalent radical of a $C_{14}$ aromatic and/or a divalent pyrene radical, the radicals $R^7$, $R^8$, and $R^9$ are monovalent, tetravalent or trivalent aromatic or heteroaromatic groups, respectively, and the radicals U, which are identical within a repeating unit, are an oxygen atom, a sulfur atom or an amino group which carries a hydrogen atom, a group having 1-20 carbon atoms, preferably a branched or unbranched alkyl or alkoxy group, or an aryl group as a further radical.

3. The polymer of claim 1, wherein the polymer has a specific volume resistance of not more than 100 Ω-cm at 25° C.

4. The polymer of claim 1, wherein the polymer swells by less than 100% in deionized water at a temperature of 90° C.

5. The polymer of claim 1, wherein the polymer has an ion exchange capacity of between 0.5 meq/g and 1.9 meq/g, based in each case on the total mass of the polymer.

6. The polymer of claim 1, wherein the polymer is provided in an electrochemical cell selected from the group consisting of a secondary battery, an electrolysis cell, and a polymer electrolyte membrane fuel cell.

7. The polymer of claim 6, wherein the fuel cell belongs to a group consisting of a hydrogen fuel cell and a direct methanol fuel cell.

8. The polymer of claim 1, wherein the polymer is provided in a membrane separation operation, selected from a context consisting of gas separation, pervaporation, perstraction, reverse osmosis, nanofiltration, electrodialysis, and diffusion dialysis.

9. The polymer of claim 1, wherein at least two of the radicals $R^2$, $R^3$ and $R^4$ to be closed to form an aromatic ring, or wherein the radical R is at least in part a group of the general formula (5C) and/or (5D)

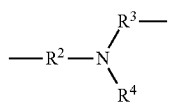

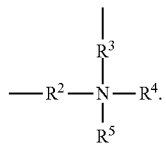

* * * * *

UNITED STATES PATENT AND TRADEMARK OFFICE
CERTIFICATE OF CORRECTION

PATENT NO. : 8,710,175 B2
APPLICATION NO. : 13/047655
DATED : April 29, 2014
INVENTOR(S) : Thomas Häring It is certified that error appears in the above-identified patent and that said Letters Patent is hereby corrected as shown below:

In the Claims

Delete Claim 2, Column 40, lines 56-66 through Column 41, lines 1-5

(1O)

~~with 0 < y < 100%~~

 (1P)

 (1Q)

 (1R)

 (1S)

Signed and Sealed this
Sixth Day of January, 2015

Michelle K. Lee
*Deputy Director of the United States Patent and Trademark Office*